United States Patent
Boxwell et al.

(10) Patent No.: US 10,984,328 B2
(45) Date of Patent: Apr. 20, 2021

(54) SOFT TEMPORAL MATCHING IN A SYNONYM-SENSITIVE FRAMEWORK FOR QUESTION ANSWERING

(71) Applicant: INTERNATIONAL BUSINESS MACHINES CORPORATION, Armonk, NY (US)

(72) Inventors: Stephen A. Boxwell, Columbus, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 15/439,219

(22) Filed: Feb. 22, 2017

(65) Prior Publication Data

US 2018/0240008 A1    Aug. 23, 2018

(51) Int. Cl.
*G06N 5/02* (2006.01)
*G06F 16/332* (2019.01)
*G06N 5/04* (2006.01)

(52) U.S. Cl.
CPC ......... *G06N 5/022* (2013.01); *G06F 16/3329* (2019.01); *G06N 5/04* (2013.01)

(58) Field of Classification Search
CPC ....................................................... G06N 5/022
USPC .......................................................... 706/11
See application file for complete search history.

(56) References Cited

U.S. PATENT DOCUMENTS

| | | | | |
|---|---|---|---|---|
| 6,108,640 | A * | 8/2000 | Slotznick | G06Q 30/06 705/7.18 |
| 8,156,111 | B2 * | 4/2012 | Jones | G06F 16/951 707/721 |
| 2006/0167825 | A1 * | 7/2006 | Sayal | G06N 5/022 706/45 |
| 2009/0171883 | A1 * | 7/2009 | Kochunni | G06Q 10/06 706/50 |
| 2015/0248613 | A1 * | 9/2015 | Harris | G06F 19/3481 706/46 |
| 2015/0293917 | A1 * | 10/2015 | Bufe, III | G06F 16/24578 706/12 |
| 2015/0356170 | A1 | 12/2015 | Allen et al. | |

OTHER PUBLICATIONS

"Exponential decay equations and graphs", Jan. 8, 2015, mathwarehouse. com, Accessed Mar. 24, 2020 at <web.archive.org/web/20150108195124/https://www.mathwarehouse.com/exponential-decay/graph-and-equation.php> (Year: 2015).*

(Continued)

*Primary Examiner* — James D. Rutten
(74) *Attorney, Agent, or Firm* — Conley Rose, P.C.

(57) ABSTRACT

The disclosed embodiments include a Question and Answer (QA) system, computer program product, and computer-implemented method configured to adjust passage relevancy to a question based on time. The disclosed embodiments seek to improve the process of providing answers to questions that include a temporal reference. In particular, the disclosed embodiments are better able to provide answers to questions that include a temporal reference that does not have an exact matching temporal reference in an answer source of a QA system.

20 Claims, 3 Drawing Sheets

(56) References Cited

OTHER PUBLICATIONS

Michael H. Böhlen, Christian S. Jensen, and Richard Thomas Snodgrass. 2000. Temporal statement modifiers. ACM Trans. Database Syst. 25, 4 (Dec. 2000), 407-456. (Year: 2000).*

Nattiya Kanhabua, "Exploiting Time-based Synonyms in Searching Document Archives," Deptartment of Computer, JCDL '10 Proceedings of the 10th Annual Joint Conference on Digital Libraries, Jun. 21-25, 2010, 10 pages.

* cited by examiner

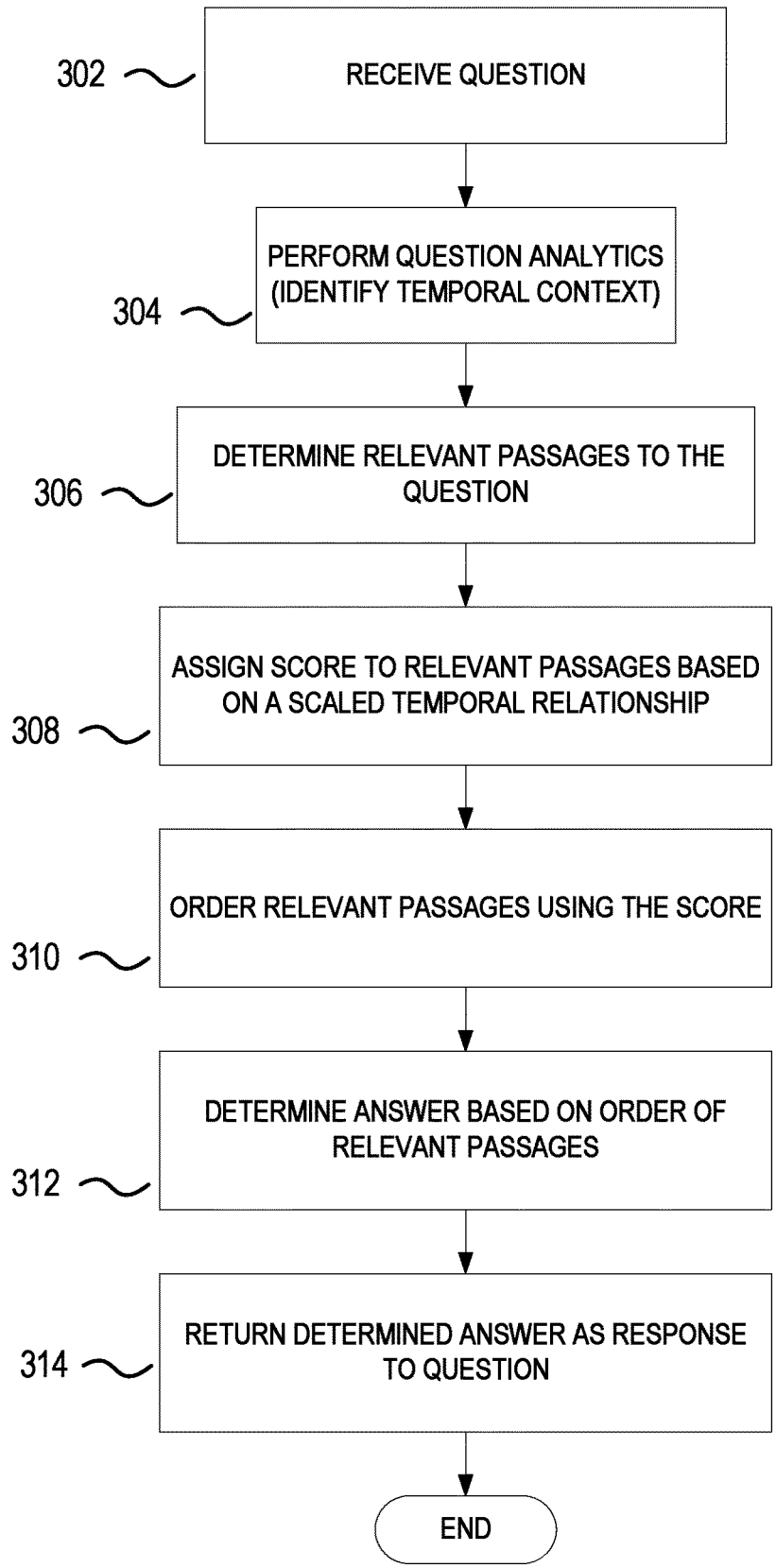

SOFT TEMPORAL MATCHING IN A SYNONYM-SENSITIVE FRAMEWORK FOR QUESTION ANSWERING

BACKGROUND

The present disclosure relates generally to Question and Answer (QA) systems. QA systems take an input question, analyze it, search and analyze a corpus of data, and return results indicative of the most probable answer to the input question. A QA system may include natural language processing (NLP), which is the ability of a computer program to understand human speech as it is spoken. One such QA system is the IBM Watson™ system available from International Business Machines (IBM) Corporation of Armonk, N.Y.

SUMMARY

The present disclosure includes various embodiments including a QA system, a computer-implemented method, and a computer program product for adjusting passage relevancy to a question based on time. The disclosed embodiments seek to improve a QA system by applying temporal reasoning to treat dates or dated events in a passage as "synonyms" of the date in the question, and score the "synonym" based on its proximity to the original, target date. The disclosed embodiments can then apply this fuzzy date logic alongside other evidence to determine the most probable answer(s) to the question.

As an example, the disclosed embodiments include a computer-implemented method performed by a QA system for adjusting passage relevancy to a question based on time. The computer-implemented method includes the step of receiving a question by the QA system. The computer-implemented method performs a question analysis that includes analyzing the question for a first temporal context. The computer-implemented method determines relevant passages in a corpus of work based on the question analysis. The computer-implemented method assigns a score to each of the relevant passages based on a scaled temporal relationship between the first temporal context in the question and a second temporal context in the relevant passages. The computer-implemented method determines an order of the relevant passages according to the score of each of the relevant passages. The computer-implemented method determines an answer to the question utilizing information extracted from the relevant passages based on the order of the relevant passages.

The disclosed embodiments also include a QA system configured to adjust passage relevancy to a question based on time. In one embodiment, the QA system includes memory that stores instructions, and a processor configured to execute the instructions to receive a question and perform a question analysis that includes analyzing the question for a first temporal context. The processor further executes instructions to determine relevant passages to the question based on the question analysis. The processor further executes instructions to assign a score to each of the relevant passages based on a scaled temporal relationship between the first temporal context in the question and a second temporal context in the relevant passages. The processor then executes instructions to determine an order of the relevant passages according to the score of each of the relevant passages.

Another disclosed embodiment is a computer program product comprising a computer readable storage medium having program instructions embodied therewith, the program instructions executable by a processor. Executing the program instructions causes the processor to receive a question and perform a question analysis that includes analyzing the question for a first temporal context; determine relevant passages to the question based on the question analysis; assign a score to each of the relevant passages based on a scaled temporal relationship between the first temporal context in the question and a second temporal context in the relevant passages; and determining an order of the relevant passages according to the score of each of the relevant passages.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a flowchart of a computer-implemented method for adjusting passage relevancy to a question based on time according to an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As referenced herein, the term "database" or "knowledge base" is defined as collection of structured (e.g., facts mined from the Web or pre-existing databases), semi-structured (e.g., Wikipedia), or unstructured data (e.g., typical web pages and blog posts). Although referred in the singular form, the database may include one or more databases, and may be locally stored on a system or may be operatively coupled to a system via a local or remote network.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

Also, as used herein, the term "communicatively coupled" means capable of sending and/or data over a communication link. The communication link may include both wired and wireless links, and may be a direct link or may comprise multiple links passing through one or more communication network devices such as, but not limited to, routers, firewalls, servers, and switches. The network device may be located on various types of networks such as local-area networks (LANs), wide-area networks (WANs), and metropolitan-area networks (MANs). The networks may include private networks and/or public networks such as the Internet. Additionally, in certain embodiments, communication links may also encompass internal communication between various components of a system and/or with an external input/output device such as a keyboard or display device.

Figure 1:
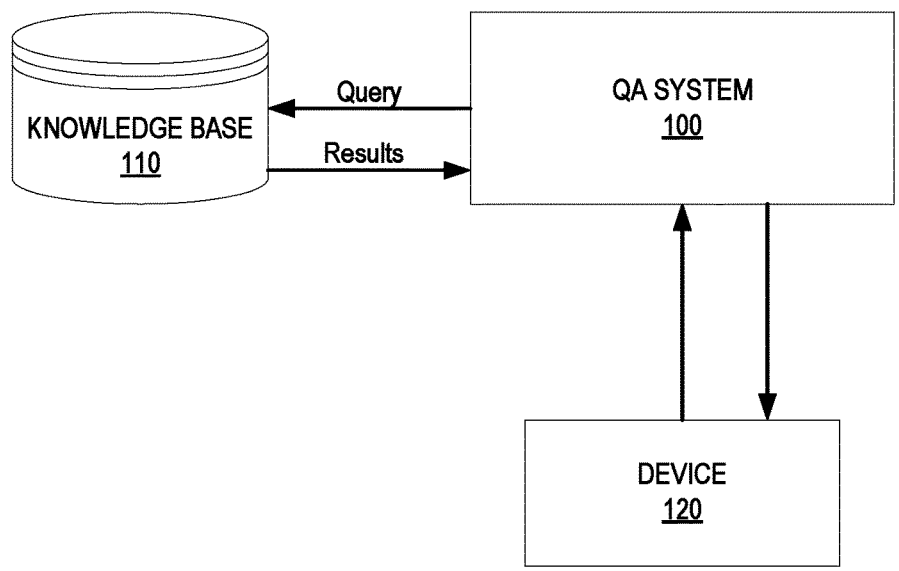
FIG. 1 is a block diagram illustrating a high level system architecture for adjusting passage relevancy to a question based on time according to an embodiment of the present disclosure.

With reference now to FIG. 1, a QA system 100 for adjusting passage relevancy to a question based on time according to an embodiment of the present disclosure is presented. The QA system 100 includes and/or is communicatively coupled to a knowledge base 110. The knowledge base 110 contains a collection or corpus of data, documents, or other works, which may include structured, semi-structured, and unstructured data. In one embodiment, the knowledge base 110 is a graph database that stores a knowledge graph that describes the data in the knowledge base 110 based on their relations. The knowledge graph may be generated from an existing knowledge graph such as, but not limited to, Yago™ and/or Freebase™ Alternatively, the knowledge graph may be generated from scratch.

The QA system 100 is configured to execute instructions for processing an input question and generating answer(s) for the input question using the information contained in the knowledge base 110. In an embodiment, the QA system 100 receives an input question from a device 120 that is communicatively coupled to the QA system 100. The device 120 may be an end user device or may be another system that uses the QA system 100. Non-limiting examples of device 120 include a personal computer (desktop or laptop), mobile devices (e.g., personal digital assistant (PDA), smart phone, tablet), and network servers. In some embodiments, only a designated or authorized device 120 may be capable of interacting with the QA system 100.

In one embodiment, the QA system 100 parses the question to identify components of the question (e.g., subject, predicate, and object), uses the identified components to formulate queries, and then applies those queries to the corpus of data contained in the knowledge base 110. Based on the application of the queries to the corpus of data, the QA system 100 generates candidate answers to the input question. The QA system 100 may utilize various scoring algorithms in generating the candidate answers. For example, a scoring algorithm may look at the matching of terms and synonyms within the language of the input question and the found portions of the corpus of data. Other scoring algorithms may look at temporal or spatial features in the language, while others may evaluate the source of the portion of the corpus of data and evaluate its reliability.

Scores may be obtained from the various scoring algorithms to indicate the extent to which the potential response is inferred by the input question based on the specific area of focus of that scoring algorithm. In an embodiment, each resulting score may be weighed against a statistical model. The statistical model captures how well the scoring algorithm performed at establishing the inference between two similar passages for a particular domain during the training period of the QA system 100. The statistical model may then be used to summarize a level of confidence that the QA system 100 has regarding the potential response, i.e. candidate answer. This process may be repeated for each of the candidate answers until the QA system 100 identifies candidate answers that surface as being significantly stronger than others and thus, generates a final answer, or ranked set of answers, for the input question.

The disclosed embodiments seek to improve upon the above process as it relates to questions that include temporal information. For example, in the question "Who was the president of the United States on Oct. 8, 1876?", the query contains a date, but that date isn't in relation to any particular event. Therefore, the knowledge base 110 is unlikely to include a document containing the exact phrase: "Ulysses S. Grant was the president of the United States on Oct. 8, 1876." Thus, current QA systems may not be able to provide an answer to the above question. Accordingly, the disclosed embodiments seek to improve the QA system 100 by providing a soft temporal matching in a synonym-sensitive framework for answering questions that include temporal information.

Figure 2:
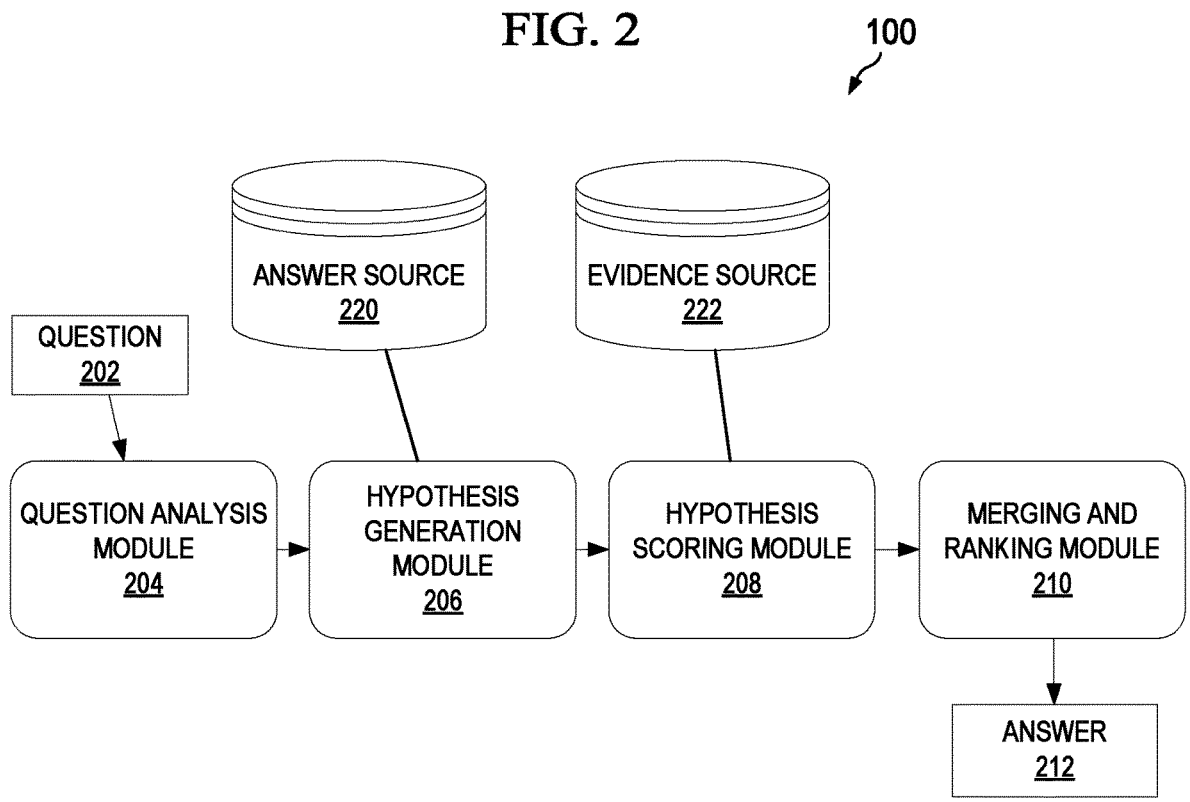
FIG. 2 is a block diagram illustrating a high level software architecture of a QA system according to an embodiment of the present disclosure.

FIG. 2 presents an example of a high level software architecture of the QA system 100 according to an embodiment of the present disclosure. In the depicted embodiment, the QA system 100 includes a question analysis module 204 that is configured to analyze a question 202. The question analysis module 204 includes algorithms that attempt to understand what the question 202 is asking and performs the initial analyses that determine how the question 202 will be processed by the rest of the QA system 100. Broadly speaking, the question analysis module 204 receives as input the unstructured text question 202 and identifies syntactic and semantic elements of the question 202, which are encoded as structured information that is later used by the other components of the QA system 100.

In one embodiment, the question analysis module 204 may include instructions for performing natural language processing (NLP), decomposition, shallow parses, deep parses, logical forms, semantic role labels, coreference, relations (e.g., subject-verb-object predicates or semantic relationships between entities), named entities, and so on, as well as specific kinds of analysis for question classification. NLP enables the QA system 100 to understand human speech. Question classification is the task of identifying question types or parts of questions that require special processing. This may include anything from single words with potentially double meanings to entire clauses that have certain syntactic, semantic, or rhetorical functionality that may inform downstream components with their analysis. In some embodiments, question classification may identify a question as a puzzle question, a math question, a definition question, and so on. Additionally, question classification may identify puns, constraints, definition components, or entire subclues within questions.

Once the question has been analyzed, a hypothesis generation module 206 includes instructions that takes the results of the question analysis and produces candidate answers by searching the system's sources such as knowledge base 110 and/or other answer source 220 and extracting answer-sized snippets from the search results. In an embodiment, a variety of search techniques may be used including the use of multiple text search engines with different underlying approaches, document search as well as passage search, knowledge base search using SPARQL on triple stores, the generation of multiple search queries for a single question, and backfilling hit lists to satisfy key constraints identified in the question. Triple store queries are based on named entities in the clue; for example, find all database entities related to the clue entities. In an embodiment, the goal of the hypothesis generation module 206 is to find as much potentially answer-bearing content (i.e., candidate answers) as possible based on the results of question analysis.

Each candidate answer or hypothesis is then passed to a hypothesis scoring module 208. The hypothesis scoring module 208 includes instructions that apply a wide variety of deep scoring analytics to evaluate each candidate answer. In one embodiment, the hypothesis scoring module 208 includes instructions to gather additional supporting evidence from knowledge base 110 and/or other evidence source 222. For example, in one embodiment, a passage search that includes the candidate answer as a required term is added to the primary search query derived from the question. This will retrieve passages that contain the candidate answer used in the context of the original question terms. Supporting evidence may also come from other sources like triple stores. The hypothesis scoring module 208 is configured to evaluate the candidate answer in the context of the supporting evidence. Additionally, in an embodiment, the hypothesis scoring module 208 includes various scoring algorithms that consider different dimensions of the evidence and produce a score that corresponds to how well evidence supports a candidate answer for a given question. For example, Watson® employs more than 50 scoring components that produce scores ranging from formal probabilities to counts to categorical features, based on evidence from different types of sources including unstructured text, semistructured text, and triple stores. These scorers consider things like the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), its aliases, and so on.

As stated above, the disclosed embodiments include a soft temporal matching scoring algorithm that seeks to improve upon the above process for providing answers to questions that include temporal information. In one embodiment, the soft temporal matching scoring algorithm is configured to introduce synonyms for date terms in passages that the QA system 100 is scoring against along with a weight that represents how strong the synonym relationship is to the original date in the question. In other words, the score of the synonym date in a passage is based on its temporal proximity to the original date in the question. For example, using the above question "Who was the president of the United States on Oct. 8, 1876?", suppose a passage includes the phrase "On Mar. 4, 1869, Grant was sworn in as the eighteenth President of the United States by Chief Justice Salmon P. Chase." In this case, soft temporal matching scoring algorithm will add "Mar. 4, 1869" as a synonym to "Oct. 8, 1876", with an appropriate score reflecting the distance between the dates. This enables the QA system 100 to process fuzzy dates (i.e., not exact dates) alongside other grammatical evidence in scoring a candidate answer. As another example, consider the question "Who was the president of the United States in 2013?" Suppose the hypothesis generation module 204 found a first passage that includes the phrase "George W. Bush was re-elected as President of the United States in 2004" and a second passage that includes the phrase "Barack Obama was re-elected as President of the United States in 2012." A naive string-matching approach would not recognize either of these passages as providing a possible answer as the dates do not match. However, the disclosed embodiments would apply a temporal score to the above passages and identify that Barack Obama is a probable answer to the question as the time difference between the second passage and the date in the question is only 1 year, whereas the time difference between the first passage and the date in the question is 9 years. Thus, the soft temporal matching scoring algorithm would generate a much higher confidence score for the second passage than for the first passage.

In one embodiment, the score is defined by a scaled temporal relationship based on a decay function, which varies depending on the nature of the original date—that is, whether the original date is a year (e.g., 1776), a month/date (July 1776), or a fully defined date (Jul. 4, 1776). One example of a decay function that may be implemented in accordance with a disclosed embodiment would be:

$$\text{score} = 1/(z^x)$$

where x is the number of units between the question date and the passage date (years, months, or days) and z is a scaling factor that is greater than 1.

In one embodiment, the number of units between the temporal context in a question and a temporal context in a passage is determined using the smallest unit in common with both the temporal context in a question and the temporal context in the passage. For example, if the question has a date of April 2014, and a passage contains a date of Jul. 4, 2016, the smallest time unit in common with both would be the month unit, thus x would be the number of months between April 2014 and Jul. 4, 2016. In another embodiment, the largest unit in common with both may be used to determine x.

As another example, suppose the question is "What president was assassinated at 2:30 in the afternoon?", and the QA system 100 encounters a passage that states "At 2:27 p.m., as Reagan exited the hotel through "President's Walk" and its T Street NW exit toward his waiting limousine, Hinckley fired a Röhm RG-14 .22LR blue steel revolver six times in 1.7 seconds, missing the president with all but one shot." In this example, "minutes" would be the relevant unit. Applying a scaling factor of 2, the QA system 100 calculates the synonym weight of "2:27" on the question term "2:30" (e.g., score=$1/(2^3)$=⅛).

In another example, suppose the question is "What period began around 8000 BC?", and the QA system 100 encounters a passage that states "The Neolithic 3 (PN) began around 6,400 BCE in the Fertile Crescent." In this case, "millennia" would be the appropriate unit. Again applying the scaling factor of 2, the QA system 100 calculates the synonym weight of "6400" on the question term "8000" (e.g., score=$1/(2^{(1.6)})$=⅓).

Although the above examples use a scaling factor of 2, the scaling factor may vary. For example, in an embodiment, the scaling factor is determined based on the domain of the question. For example, questions related to Presidents of the United States may have a smaller scaling factor than questions related to Olympic swimmers because the time references related to U.S. Presidents are generally in terms of days, months, or years, whereas the time references related to Olympic swimmers may be in terms of minutes, seconds, or milliseconds. The higher the scaling factor, the faster the score will diminish as a reference time/date (i.e., passage synonym) gets further away from the date in the question. Thus, by adjusting the scaling factor, the disclosed embodiments are likely to generate better scores for passages that are more relevant to answering the question.

In an embodiment, the QA system 100 may also be configured to handle questions that include dated events, like in "Who was the president of the United States on D-Day?" In this case, in one embodiment, date entities can be replaced with the date in question (i.e., Jun. 6, 1944), to better match passages like "FDR was president in 1944."

Additionally, in an embodiment, the QA system 100 may be configured to modify the scaled temporal relationship based on a temporal modifier found in the question. For example, in an embodiment, the soft temporal matching scoring algorithm may include instructions to divide temporal meta-modifiers (for example, prepositions that go along with a temporal modifier) into three types: Those that prefer dates that come before them, those that prefer dates that come after them, and dates that are equally strong either way. For example, if the question includes the temporal meta-modifier "after" (as in "Who was elected president of the United States after 2006?"), the soft temporal matching scoring algorithm would score a sentence like "Barack Obama was elected president of the United States in 2008" a lot higher than a sentence like "George Bush was elected president of the United States in 2004". In one embodiment, the soft temporal matching scoring algorithm may split the scaling factor z into two scaling factors: one for dates that precede the target date, and another for dates that follow it. In the case of "after" and other temporal meta-modifiers, the scaling factor would be closer to 1 for dates that follow it and be farther away from 1 for dates that precede it. In the case of "before" or "as of" or "up until", the magnitude of the scaling factors would be reversed. For more temporally neutral meta-modifiers like "in" or "on", the values would be kept about the same.

After each of the candidate answers are scored by the various scoring algorithms, a merging and ranking module 210 evaluates the various hypotheses by merging all of the various scores of each candidate answer. After merging, the merging and ranking module 210 ranks the hypotheses to identify the single best-supported hypothesis given the evidence to produce an answer 212. In one embodiment, the merging and ranking module 210 may be configured to provide an estimate of its confidence that the answer is correct.

Figure 4:
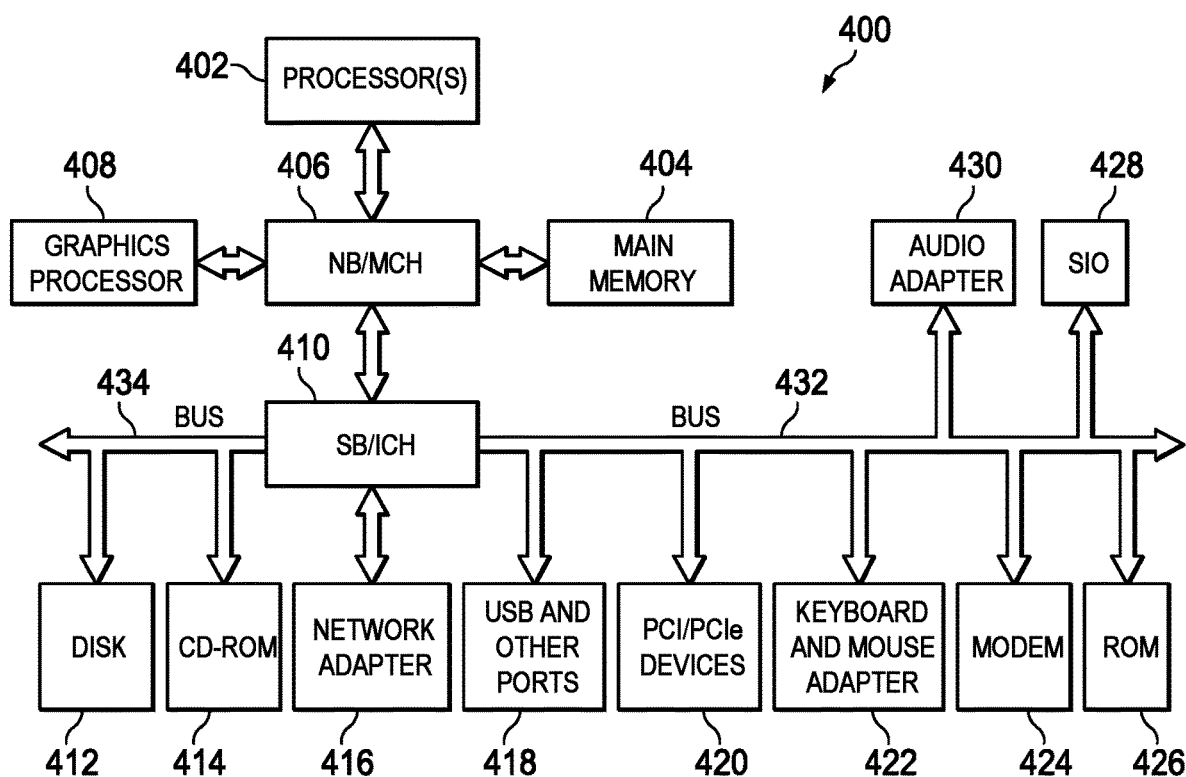
FIG. 4 is a block diagram illustrating a high level hardware architecture of a QA system according to an embodiment of the present disclosure.

FIG. 3 is a flowchart of a computer-implemented method 300 for adjusting passage relevancy to a question based on time according to an embodiment of the present disclosure. In an embodiment, the computer-implemented method 300 may be implemented in the modules described in FIG. 2 using any form of computer executable instructions and executed by a processor as shown in FIG. 4. The computer-implemented method 300 begins at step 302 by receiving a question. At step 304, the computer-implemented method 300 analyzes the question as described above. In accordance with the disclosed embodiments, the question analysis includes analyzing the question for a first temporal context (i.e., a time/date reference in the question). At step 306, the computer-implemented method 300 compares passages in a knowledge base or answer source to determine relevant passages to the question based on the question analysis.

At step 308, the computer-implemented method 300 assigns a score to each of the relevant passages based on a scaled temporal relationship between the first temporal context in the question and a second temporal context in the relevant passages. For example, assume the question that is asked is "As of 2012, what is the only other operational global positioning system (GPS) apart from the United States NAVSTAR GPS?" A first relevant passage found by the computer-implemented method 300 states "As of April 2014, only the United States NAVSTAR Global Positioning System (GPS) and the Russian GLONASS are operational Global Navigation Satellite Systems (GNSSs)." The computer-implemented method 300 adds the date April 2014 as a synonym to the "2012" question token, corresponding to the desired date. Using "years" as the unit and a scaling factor of 2, the computer-implemented method 300 determines the following score:

$$\text{score} = 1/(2^2) = \frac{1}{4}$$

So, in this case, the first passage with the "April 2014" date will match the 2012 question date with a score of 0.25, instead of failing to match completely as in current QA systems. This matches our intuition that "April 2014" is fairly close to the desired "as of" date, which might be good enough.

Assume that the computer-implemented method 300 encounters a second passage containing contradictory information, but having a closer date. For example, the second passage might state "As of December 2013, only the United States NAVSTAR Global Positioning System (GPS) was operational, due to the catastrophic failure of the Russian GLONASS." In this case, the second passage would match its date more closely to the question date of 2012 and generate a higher score of 0.5.

At step 310, the computer-implemented method 300 determines an order of the relevant passages using the score of each of the relevant passages. In one embodiment, the order of the relevant passages may take into account the scores generated by other scoring algorithms as they pertain to the relevant passages.

The computer-implemented method 300 determines an answer to the question based on the order of the relevant passages at step 312. The determined answer is returned as a response to the question at step 314. For example, returning the determined answer may include displaying the determined answer on a display device and/or may include audibly presenting the determined answer. In some embodiments, the determined answer may be transmitted to another device such as in the case where the question is received from a remote device. Still, in some embodiments, the determined answer may be used by the system or by another system as a factor in determining an answer to another question or problem. Additionally, the computer-implemented method 300 may be configured to provide an estimate of its confidence that the determined answer is correct, with the computer-implemented method 300 terminating thereafter.

The QA system 100 may be implemented on one or more computing devices that include at least a processor and memory or other types of data processing and storage components. As a non-limiting example, FIG. 4 is a block diagram of an example data processing system 400 in which aspects of the illustrative embodiments may be implemented. Although data processing system 400 depicts the basic components of a computing system, the disclosed embodiments may also be implemented in very advance systems such as an IBM® Power 750 servers or the IBM Watson® supercomputer, which employs a cluster of ninety IBM Power 750 servers, each of which uses a 3.5 GHz POWER7 eight-core processor, with four threads per core.

In the depicted example, the data processing system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP). A computer bus, such as bus 432 or bus 434, may be implemented using any type of communication fabric or architecture that provides for a transfer of data between different components or devices attached to the fabric or architecture.

In the depicted example, LAN adapter 416 connects to SB/ICH 410. Audio adapter 430, keyboard and mouse adapter 422, modem 424, read-only memory (ROM) 426, hard disk drive (HDD) 412, compact disk read-only memory (CD-ROM) drive 414, universal serial bus (USB) ports and other communication ports 418, and peripheral component interconnect/peripheral component interconnect express (PCI/PCIe) devices 420 connect to SB/ICH 410 through bus 432 and bus 434. PCI/PCIe devices 420 may include, for example, Ethernet adapters, add-in cards, and PC cards for notebook computers. PCI uses a card bus controller, while PCIe does not. ROM 426 may be, for example, a flash basic input/output system (BIOS). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. Super I/O (SIO) device 428 may be connected to SB/ICH 410. In some embodiments, HDD 412 may be replaced by other forms of data storage devices including, but not limited to, solid-state drives (SSDs).

An operating system runs on processor(s) 402. The operating system coordinates and provides control of various components within the data processing system 400. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, is executed on data processing system 400.

The data processing system 400 may include a single processor 402 or may include a plurality of processors 402. Additionally, processor(s) 402 may have multiple cores. For example, in one embodiment, data processing system 400 may employ a large number of processors 402 that include hundreds or thousands of processor cores. In some embodiments, the processors 402 may be configured to perform a set of coordinated computations in parallel.

Instructions for the operating system, applications, and other data are located on storage devices, such as one or more HDD 412, and may be loaded into main memory 404 for execution by processor(s) 402. In certain embodiments, HDD 412 may include a knowledge graph in the form of a triplestore or resource description framework (RDF) store for the storage and retrieval of RDF triples through semantic queries. In some embodiments, additional instructions or data may be stored on one or more external devices. The processes described herein may be performed by processor(s) 402 using computer usable program code, which may be located in a memory such as, for example, main memory 404, ROM 426, or in one or more peripheral devices 412 and 414.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be apparent from the foregoing that the disclosed embodiments have significant advantages over current art. As an example, the disclosed embodiments utilize actual questions to determine the useful and missing information from a knowledge graph. Thus, the knowledge graph is not filled simply with irrelevant information. This improves the efficiency of the system because the system is able to perform a query faster on a smaller knowledge graph than a large one, and at the same time, the knowledge graph should include the desired information. Another advantage is that the disclosed embodiments utilize a game implementation that benefits from various users contributing information to the knowledge graph in a fun way. Compared to other knowledge-extension techniques, the human labor expense is greatly reduced with the disclosed embodiments. Additionally, knowledge can be gathered cheaply from people with more widely available technical skills. Moreover, the symbiotic relationship between the discovery tool and the game platform creates a virtuous cycle where the use of the discovery tool improves the game platform by providing puzzle content, and the use of the game platform in turn improves the discovery tool by increasing the coverage of the knowledge graph.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by a Question and Answer (QA) system for adjusting passage relevancy to a question based on time, the computer-implemented method comprising:
   receiving a question by the QA system;
   performing a question analysis, wherein the question analysis includes analyzing the question for a first temporal context;
   comparing passages in a knowledge base to determine relevant passages to the question based on the question analysis;
   identifying a temporal modifier found in the question that modifies the first temporal context located in the question;
   adjusting a scaled temporal relationship based on the temporal modifier found in the question by adjusting a scaling factor used in calculating the scaled temporal relationship based on the temporal modifier, wherein the scaling factor is a first scaling factor for a first temporal modifier and the scaling factor is a second scaling factor for a second temporal modifier;
   assigning a score to each of the relevant passages based on the scaled temporal relationship between the first temporal context in the question and a second temporal context in the relevant passages;
   determining an order of the relevant passages using the score of each of the relevant passages;
   determining an answer to the question utilizing information extracted from the relevant passages based on the order of the relevant passages; and
   returning the answer as a response to the question.

2. The computer-implemented method of claim 1, wherein the scaled temporal relationship is determined using a decay function.

3. The computer-implemented method of claim 2, wherein the decay function is $1/Z^X$, and wherein Z is the scaling factor that is greater than 1 and X is a number of units between the first temporal context in the question and the second temporal context in a relevant passage.

4. The computer-implemented method of claim 3, wherein the scaling factor is domain dependent based on a subject of the question.

5. The computer-implemented method of claim 3, wherein the number of units between the first temporal context in the question and the second temporal context is determined using a smallest unit in common with both the first temporal context and the second temporal context.

6. The computer-implemented method of claim 1, wherein the first temporal context is a dated event, and wherein the computer-implemented method converts the dated event into an actual date in assigning the score.

7. The computer-implemented method of claim 1, wherein the temporal modifier is selected from a group comprising before, after, and near.

8. A Question and Answer (QA) system configured to adjust passage relevancy to a question based on time, the system comprising a processor configured to execute instructions to:
receive a question by the QA system;
perform a question analysis, wherein the question analysis includes analyzing the question for a first temporal context;
identify a temporal modifier found in the question that modifies the first temporal context located in the question;
adjust a scaled temporal relationship based on the temporal modifier found in the question by adjusting a scaling factor used in calculating the scaled temporal relationship based on the temporal modifier, wherein the scaling factor is a first scaling factor for a first temporal modifier and the scaling factor is a second scaling factor for a second temporal modifier;
compare passages in a knowledge base to determine relevant passages to the question based on the question analysis;
assign a score to each of the relevant passages based on the scaled temporal relationship between the first temporal context in the question and a second temporal context in the relevant passages;
determine an order of the relevant passages according to the score of each of the relevant passages;
determine an answer to the question utilizing information extracted from the relevant passages based on the order of the relevant passages; and
return the answer as a response to the question.

9. The system of claim 8, wherein the scaled temporal relationship is determined using a decay function.

10. The system of claim 9, wherein the decay function is $1/Z^X$, and wherein Z is the scaling factor that is greater than 1 and X is a number of units between the first temporal context in the question and the second temporal context in a relevant passage.

11. The system of claim 10, wherein the number of units between the first temporal context in the question and the second temporal context is determined using a smallest unit in common with both the first temporal context and the second temporal context.

12. The system of claim 10, wherein the temporal modifier is selected from a group comprising before, after, and near.

13. The system of claim 8, wherein the processor further executes instructions to convert a dated event into an actual date in assigning the score.

14. The system of claim 8, wherein the processor further executes instructions to adjust the scaling factor based on a subject of the question.

15. A computer program product for adjusting passage relevancy to a question based on time, the computer program product comprising a computer readable storage medium having program instructions embodied therewith, the program instructions executable by a processor to cause the processor to:
perform a question analysis, wherein the question analysis includes analyzing a question for a first temporal context;
identify a temporal modifier found in the question that modifies the first temporal context located in the question;
adjust a scaled temporal relationship based on the temporal modifier found in the question by adjusting a scaling factor used in calculating the scaled temporal relationship based on the temporal modifier, wherein the scaling factor is a first scaling factor for a first temporal modifier and the scaling factor is a second scaling factor for a second temporal modifier;
determine relevant passages to the question based on the question analysis;
assign a score to each of the relevant passages based on a scaled temporal relationship between the first temporal context in the question and a second temporal context in the relevant passages;
determine an order of the relevant passages according to the score of each of the relevant passages;
determine an answer to the question utilizing information extracted from the relevant passages based on the order of the relevant passages; and
return the answer as a response to the question.

16. The computer program product of claim 15, wherein the scaled temporal relationship is determined using a decay function.

17. The computer program product of claim 16, wherein the decay function is $1/Z^X$, and wherein Z is the scaling factor that is greater than 1 and X is a number of units between the first temporal context in the question and the second temporal context in a relevant passage.

18. The computer program product of claim 17, wherein the number of units between the first temporal context in the question and the second temporal context is determined using a smallest unit in common with both the first temporal context and the second temporal context.

19. The computer program product of claim 18, wherein the temporal modifier is selected from a group comprising before, after, and near.

20. The computer program product of claim 15, wherein the program instructions executable by the processor further includes instructions to adjust the scaling factor based on a subject of the question.

* * * * *